United States Patent
Bishop

(10) Patent No.: US 9,194,414 B2
(45) Date of Patent: Nov. 24, 2015

(54) FASTENER

(75) Inventor: Jeffrey C. Bishop, Derby (GB)

(73) Assignee: ROLLS-ROYCE plc, London (GB)

(*) Notice: Subject to any disclaimer, the term of this patent is extended or adjusted under 35 U.S.C. 154(b) by 120 days.

(21) Appl. No.: 13/376,278

(22) PCT Filed: May 25, 2010

(86) PCT No.: PCT/EP2010/057126
§ 371 (c)(1),
(2), (4) Date: Dec. 5, 2011

(87) PCT Pub. No.: WO2010/142524
PCT Pub. Date: Dec. 16, 2010

(65) Prior Publication Data
US 2012/0073094 A1    Mar. 29, 2012

(30) Foreign Application Priority Data

Jun. 11, 2009 (GB) .................................. 0909984.7

(51) Int. Cl.
*A44B 17/00* (2006.01)
*F16B 21/06* (2006.01)
*F16B 5/06* (2006.01)

(52) U.S. Cl.
CPC ............... *F16B 21/06* (2013.01); *F16B 5/0642* (2013.01); *Y10T 24/45257* (2015.01)

(58) Field of Classification Search
CPC ........................ Y10S 411/913; B60R 13/0206
USPC ............. 24/594.11, 594.1, 297; 411/508–512
See application file for complete search history.

(56) References Cited

U.S. PATENT DOCUMENTS

| | | | |
|---|---|---|---|
| 2,303,148 A * | 11/1942 | Tinnerman | 411/111 |
| 2,911,575 A * | 11/1959 | Roberts, Jr. | 257/733 |
| 4,112,815 A | 9/1978 | Tanaka | |
| 4,606,688 A * | 8/1986 | Moran et al. | 411/175 |
| 4,681,288 A * | 7/1987 | Nakamura | 248/71 |

(Continued)

FOREIGN PATENT DOCUMENTS

| | | |
|---|---|---|
| EP | 1 887 231 A1 | 2/2008 |
| GB | 2 444 729 A | 6/2008 |
| WO | WO 02/35105 A1 | 5/2002 |

OTHER PUBLICATIONS

Sep. 14, 2010 Written Opinion of the International Searching Authority issued in International Application No. PCT/EP2010/057126.

(Continued)

*Primary Examiner* — Robert J Sandy
*Assistant Examiner* — Rowland Do
(74) *Attorney, Agent, or Firm* — Oliff PLC

(57) ABSTRACT

A fastener (1) is provided for clamping a first component (25) to a second component (27). The fastener has at least one resiliently deformable snap-fit member (5) which, in use, is inserted from a first side of the components through a channel (29, 31) extending thereacross. The snap-fit (5) member has an abutment surface (7) which, on emerging from the channel (29, 31), enters into snap-fit engagement with an opposing second side of the components to prevent retraction of the snap-fit member (5). The fastener (1) further has a spring arrangement which presses on the first side of the components on the insertion of the snap-fit member (5) to apply a compressive clamping force across the components between the spring arrangement and the abutment surface (7).

14 Claims, 4 Drawing Sheets

(56) References Cited

U.S. PATENT DOCUMENTS

| | | | |
|---|---|---|---|
| 4,973,212 A | 11/1990 | Jacobs | |
| 5,368,261 A * | 11/1994 | Caveney et al. | 248/73 |
| 5,762,397 A | 6/1998 | Venuto et al. | |
| 5,799,906 A * | 9/1998 | Hillegonds | 248/49 |
| 6,474,921 B1 * | 11/2002 | Gordon | 411/508 |
| 7,073,230 B2 * | 7/2006 | Boville | 24/297 |
| 7,096,545 B2 * | 8/2006 | Uehara et al. | 24/614 |
| 7,435,904 B2 * | 10/2008 | Peterson et al. | 174/72 A |
| 7,552,516 B2 * | 6/2009 | Okada et al. | 24/297 |
| 8,046,879 B2 * | 11/2011 | Werner et al. | 24/297 |
| 8,695,181 B2 * | 4/2014 | Kaneko et al. | 24/625 |
| 2004/0265094 A1 * | 12/2004 | Gordon | 411/508 |
| 2007/0186394 A1 * | 8/2007 | Hsiao | 24/614 |
| 2013/0272783 A1 * | 10/2013 | Ramsauer | 403/330 |

OTHER PUBLICATIONS

Sep. 14, 2010 International Search Report issued in International Application No. PCT/EP2010/057126.

* cited by examiner

FASTENER

The present invention relates to a fastener for clamping a first component to a second component.

BACKGROUND

There are many known devices that are used to retain or join components together in either a temporary or permanent cohesion. Rivets and other types of deformable clipping devices (plastic or metal) are typical of permanent retainers. Threaded fasteners and spring-clips (e.g. circlip types) can be used as temporary, semi-permanent or permanent retainers dependent on their application. Temporary or semi-permanent retainers have retaining mechanisms that can be easily reversed.

Threaded fasteners, whether or not they require simple tools to operate them, take time and effort to generate their (axial) retention capabilities. They can also be awkward to assemble correctly in confined spaces.

Spring-clips, and circlips in particular, can ensure that two or more components are not able to be separated, but do not necessarily guarantee that the components are in a fixed static relationship. Also, spring-clips usually require simple tools for insertion and removal.

SUMMARY

Thus a first aspect of the present invention provides a fastener for clamping a first component to a second component, the fastener having:

at least one resiliently deformable snap-fit member which, in use, is inserted from a first side of the components through a channel extending thereacross, the snap-fit member having an abutment surface which, on emerging from the channel, enters into snap-fit engagement with an opposing second side of the components to prevent retraction of the snap-fit member, and a spring arrangement which presses on the first side of the components on the insertion of the snap-fit member to apply a compressive clamping force across the components between the spring arrangement and the abutment surface.

Advantageously, the fastener applies a compressive clamping force in the manner of a threaded fastener, but the use of one or more snap-fit members allows the fastener to be more easily deployed, i.e. typically by simply pushing the fastener into the components in a single action. Further, the use of tooling to deploy the fastener can be avoided.

The fastener may have any one or any combination of the following optional features.

Preferably, the fastener has a thumb pad which facilitates manual insertion of the snap fit member. The thumb pad can provide a convenient location for an operator to push on the fastener.

More preferably, the thumb pad is detachable from the fastener. This allows the thumb pad to be removed after deployment of the fastener.

Typically, the snap-fit member has a ramp surface which presses against a side of the channel to laterally deflect the snap-fit member during its insertion, the snap-fit member returning to its pre-deflected configuration when the abutment surface emerges from the channel. For example, the snap-fit member can be a tine with the ramp surface formed along at least a portion of an edge of the tine.

Preferably, the snap-fit member is configured to facilitate manual release of the abutment surface from engagement with the second side of the components. This allows the fastener to be removed from the components. Indeed, the fastener can be repeatably deployed and released. For example, the snap-fit member can be shaped so that after deployment of the fastener, the member projects a significant distance beyond the second side of the components, giving an operator a finger-hold on the member which allows the operator to apply a force sufficient to reverse the snap-fit engagement of the abutment surface.

Preferably, the fastener has two or more snap-fit members. More preferably, the fastener has only two snap-fit members. Conveniently, two side-by-side snap-fit members can be configured to allow an operator to manually and simultaneously release both of their abutment surfaces from engagement with the second side of the components, e.g. by pushing the two members together.

The spring arrangement may comprise one or more spring arms which press on the first side of the components. However, the spring arrangement can take many other forms. For example, the spring arrangement may comprise a helical compression spring, or a body of elastically compressible material.

A further aspect of the invention provides the combination of a fastener according to the previous aspect (optionally having any one or any combination of the optional features of that fastener) and a side plate having one or more holes for forming the ends of respective channels across the components, in use, the side plate being located at the first or second side of the components to respectively provide a surface on which the spring arrangement presses, or a surface which enters into snap-fit engagement with the abutment surface.

For example, the channel across the components may be too wide at its exit at the second side to provide a surface against which the abutment surface of the snap-fit member can engage. This difficulty can, however, be overcome by locating the side plate at the second side. Likewise, if the channel is too wide at its entrance at the first side to provide a suitable surface on which the spring arrangement can press, this difficulty can be overcome by locating the side plate at the first side. The side plate can also help to spread the compressive load exerted by the fastener e.g. to avoid causing surface damage on the components.

The combination may further include a second side plate which, in use, is located at the other of the first and second sides of the components.

DETAILED DESCRIPTION

Embodiments of the invention will now be described by way of example with reference to the accompanying drawings in which.

Figure 1:
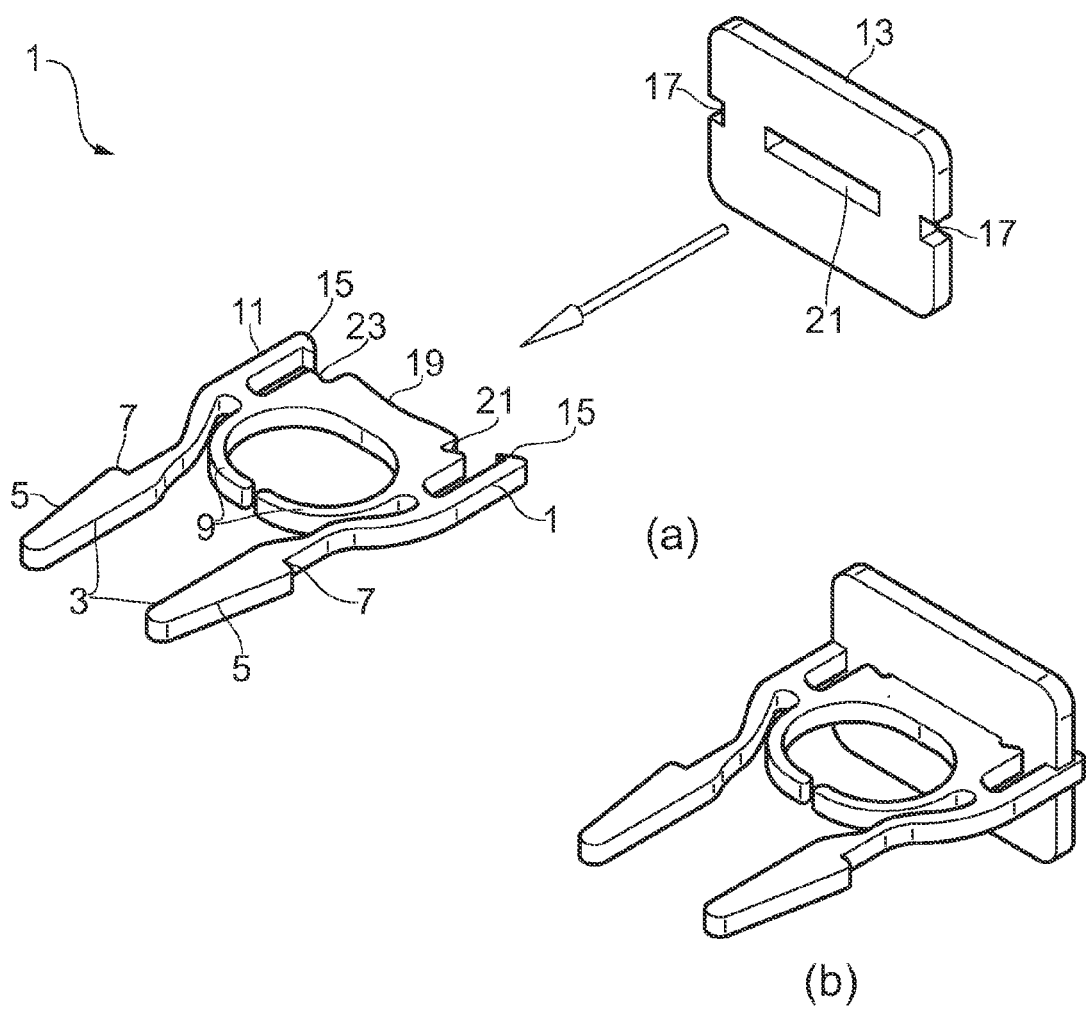
FIG. 1 shows perspective views of a fastener according to an embodiment of the present invention (a) before attachment of a thumb pad to the fastener, and (b) after attachment of the thumb pad.
Figure 3:
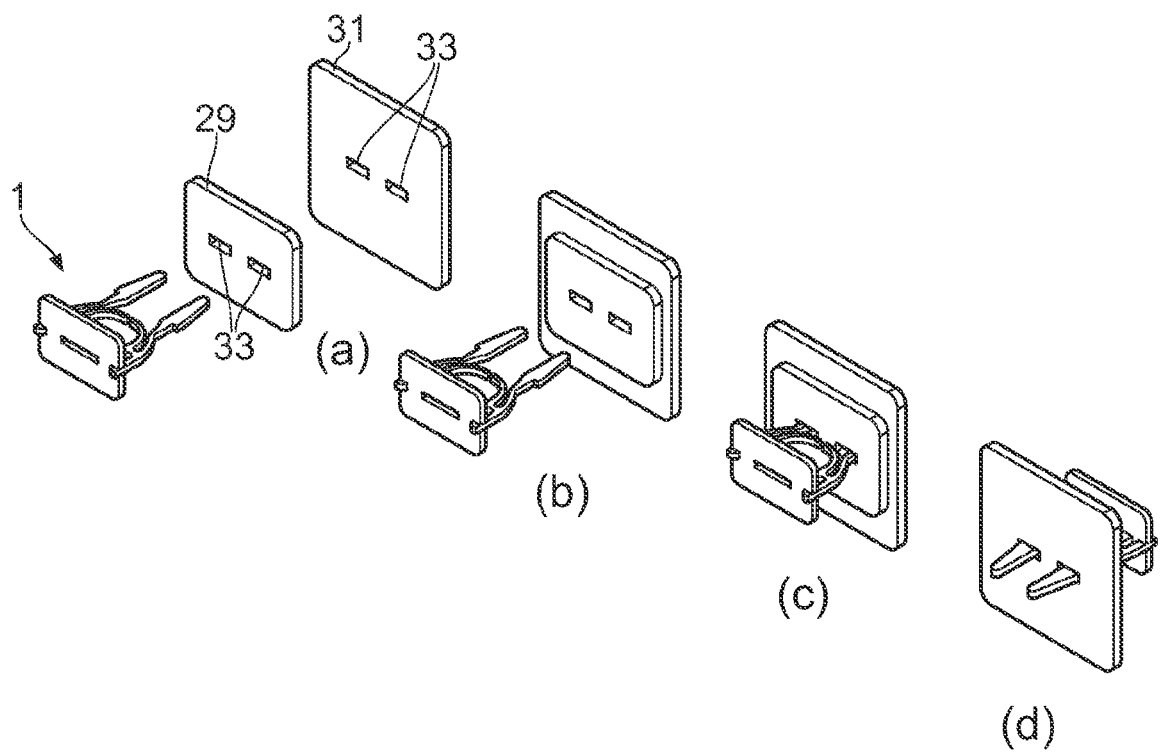
Figure 4:
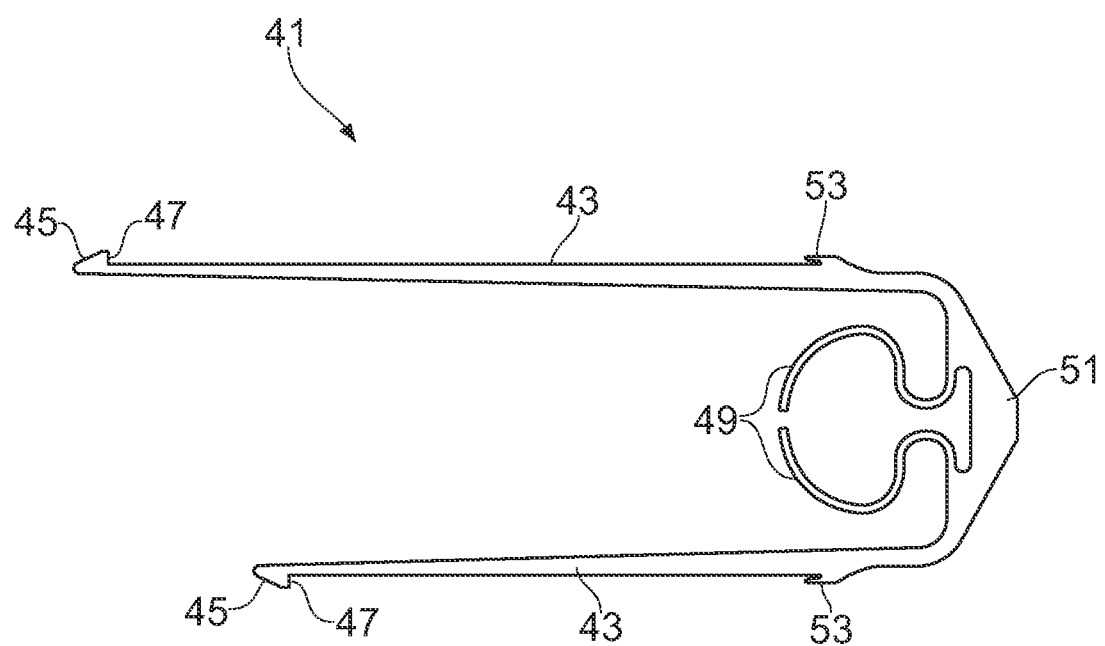

FIGS. 3(a) to (d) show perspective views of the fastener of FIG. 1 to illustrate stages in its deployment through two such side plates; and FIG. 4 shows schematically a side view of a further embodiment of a fastener according to the present invention.

FIG. 1(a) shows a perspective view of a fastener according to an embodiment of the present invention before attachment of a thumb pad to the fastener.

The fastener 1 is a type of spring-clip which advantageously possesses attributes usually associated with a threaded fastener, such as compression clamping and positive location resulting in two or more separate components being retained in a fixed static relationship.

The fastener has three different types of spring members.

Firstly, a pair of side-by-side, resiliently deformable snap-fit tines 3 extend forward from fastener. In use, the tines are pushed into the components along respective channels which cross from one side to another of the components (for example, the components, when positioned in readiness to receive the fastener, may each have a through-hole or though-holes into which the tines can be inserted, the through-hole(s) of one component being aligned with the through-hole(s) of the other). Each tine has an outwardly-facing lead-in ramp 5 which presses against a side of the channel so that the tines are both deflected inwardly during the insertion. The lead-in ramps end in respective abutment surfaces 7. When these surfaces exit from the channel on the far side of the components, the tines spring outwardly to recover their pre-deflected configuration, and the abutment surfaces move into snap-fit engagement with the far side of the components to prevent retraction of the fastener.

Secondly, a pair of spring arms 9 extend inwardly from opposing sides of the fastener. When the tines 3 are pushed into the channel, the end portions of the arms make contact with the side of the components having the entrance to the channel and begin to apply a compressive force to that side. This force progressively increases until the abutment surfaces 7 of the tines move into snap-fit engagement, at which point the fastener is fully deployed. A compressive clamping force is thus applied between the spring arms and the abutment surfaces urging the components to come together. The distance along the line of insertion between the end portions of the spring arms and the abutment surfaces, relative to the thickness of the components, as well as the compliance of the spring arms, determines the strength of the clamping force. As the fastener provides little or no mechanical advantage, this force is also the resistance which an operator must overcome in order to deploy the fastener.

Thirdly, a further pair of spring arms 11 extend rearwardly from the fastener to allow removable attachment of a thumb pad 13. The further spring arms end in tabs 15 which reversibly clip around corresponding recesses 17 in the pad. A central projection 19 extending rearwardly from the fastener fits into a corresponding central cavity 21 of the pad, the projection having shoulders 23 to support the pad. The pad provides a comfortable pressure-distribution area for manual deployment of the fastener. The arrow in FIG. 1(*a*) indicates the direction of attachment of the thumb pad onto the fastener. FIG. 1(*b*) shows a perspective view of the fastener after attachment of the thumb pad.

Figure 2:
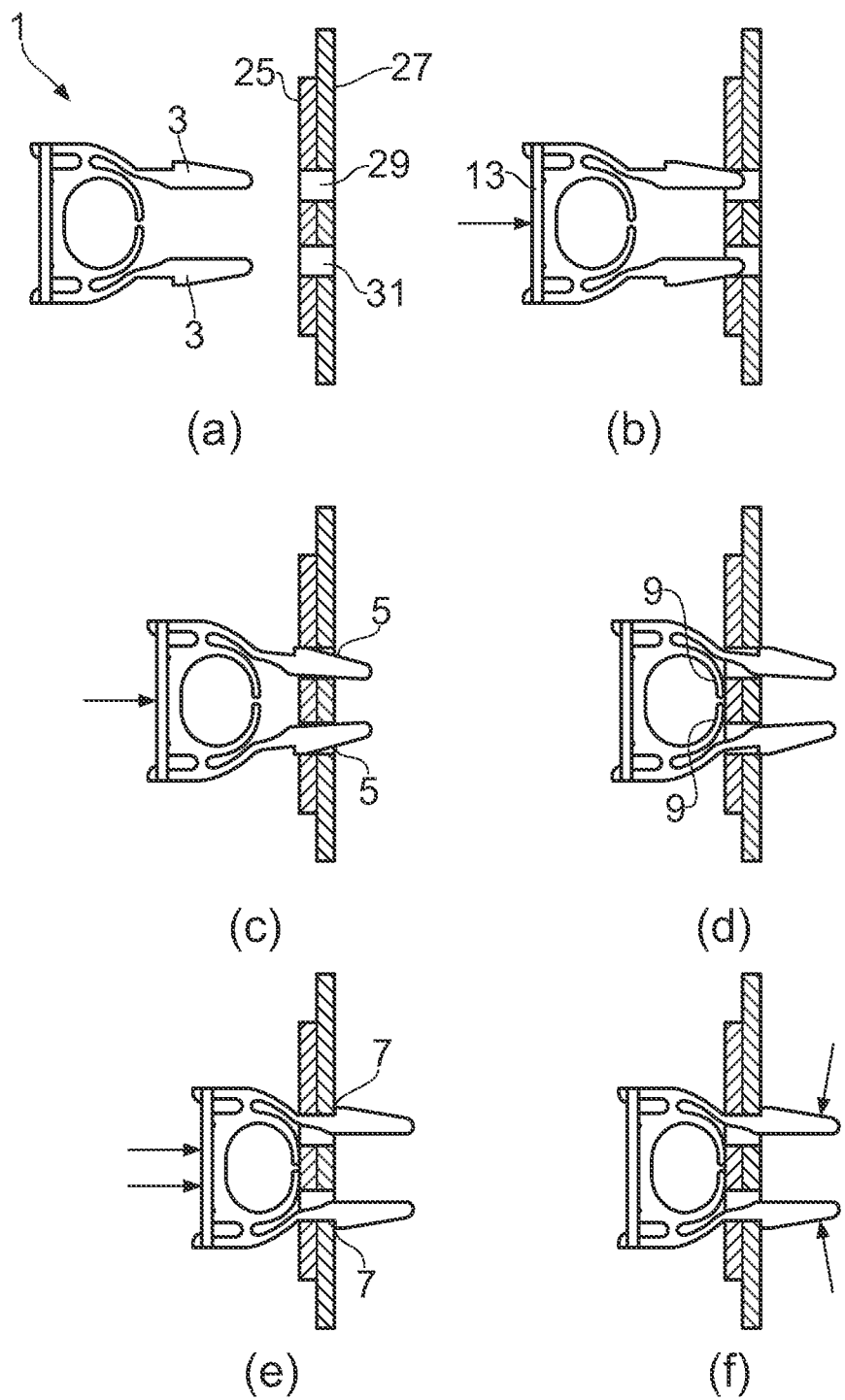
FIG. 2 shows schematically side views of the fastener of FIG. 1 to illustrate stages (a) to (f) in the deployment and removal of the fastener.

FIG. 2 shows schematically side views of the fastener of FIG. 1 to illustrate stages (a) to (f) in the deployment and removal of the fastener. In FIG. 2(*a*) the fastener 1 is offered-up to the two components 25, 27, the tines 3 of the fastener being aligned with the entrances to channels 29, 31 across the components, each channel itself being formed by aligned through-holes in the components. In FIG. 2(*b*) the fastener is engaged with the components by inserting the forward ends of the tines into the channels, pressure (indicated by the arrow) being exerted on the thumb pad 13. In FIG. 2(*c*) the tines are pushed through the channels by further pressure on the thumb pad, the tines bending together under a sideways force exerted on lead-in ramps 5. In FIG. 2(*d*) the insertion continues and the end portions of the spring arms 9 make first contact with a side of the components. In FIG. 2(*e*) further pressure on the thumb pad (indicated by the double arrows) results in the abutment surfaces 7 exiting the channels, whereupon the tines spring outwardly, and the abutment surfaces enter into snap-fit engagement with the far side of the components. The components are now held together by a compressive clamping-force exerted between the spring arms 9 and the abutment surfaces 7. Finally, as shown in FIG. 2(*f*), to remove the fastener, a sideways force (indicated by the arrows) can be exerted on the ends of the tines 1, which extend a distance beyond the far side of the components. This moves the abutment surfaces out of engagement with the side of the component and allows the fastener to be retracted. As there is little or no load generated in the tines in a direction perpendicular to the action of the spring arms 9, rapid release of the fastener is easily administered by manually pinching or squeezing the tines together.

If the channels through the components are poorly shaped to apply a force to the lead-in ramps 5, do not have surfaces suitably located to engage with the abutment surfaces 7 or spring arms 9, or have surfaces that might be damaged by direct contact with the fastener, then side plates having holes for receiving the tines can be located at the sides of the components. FIGS. 3(*a*) to (*d*) show perspective views of the fastener 1 of FIG. 1 to illustrate stages in its deployment through two such side plates 29, 31. Evidently, two components to be held together can be sandwiched between the plates, the components having a through channel or channels aligned with the holes 33 of the side plates. In FIGS. 3(*a*) to (*c*) the fastener 1 is viewed from one side of the side plates 29, 31, and in FIG. 3(*d*) from the other side of the side plates. The side plate 29 provides a surface on which the spring arms 9 can press, and the side plate 31 provides a surface on which the abutment surfaces 7 can enter into snap-fit engagement. The holes of the side plates are spaced an appropriate distance apart such that the lead-in ramps 5 press against the sides of the holes as the fastener is inserted to squeeze the tines together.

The configuration of the fastener can be varied to a large degree depending on the particular application. For example, just some of the variables are:

overall size of fastener shape and rate of spring arms which apply the compressive clamping force overall clamping length size and shape abutment surfaces length of tines Further, although the fastener of the embodiment described above is suitable for direct manual deployment, in other embodiments, the fastener may be configured such that the force needed to deploy the fastener e.g. requires the fastener to be struck by a percussive instrument such as a hammer or mallet. Possibly then also a tool will be required to squeeze the tines together to remove the fastener. However, such a configuration allows a greater clamping force to be applied by the fastener. FIG. 4 shows schematically a side view of a further embodiment of a fastener 41 according to the present invention. Like the fastener of the first embodiment, the fastener of the further embodiment has tines 43, lead-in ramps 45, abutment surfaces 47, and spring arms 49. However, the fastener now has a percussion surface 51 for receiving the strike of a percussive instrument. Further the tines are longer and of different lengths to accommodate wider components of non-constant width. Also the fastener may have locater projections 53 to create specific (e.g. sprung) location points that not only locate the fastener in a specifically required position but also act as lateral locators to prevent lateral displacement of the fastener during a percussive insertion.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

The invention claimed is:

1. A fastener for clamping a first component to a second component, the fastener comprising:
   two resiliently deformable snap-fit members which, in use, are inserted from a first side of the first and second components through two channels in each of the first and second components, each of the resiliently deformable snap-fit members being insertable into a respective one of the two channels, the two channels being formed in each of the first and second components, each of the snap-fit members having an abutment surface which, in said use, on emerging from the respective channel, enters into a snap-fit engagement with an opposing second side of the components to prevent retraction of the respective snap-fit member; and
   a spring arrangement which, in said use, presses on the first side of the components between the channels on the insertion of the snap-fit members to apply a compressive clamping force across the components between the spring arrangement and the abutment surfaces,
      wherein the spring arrangement and the two resiliently deformable snap-fit members are arranged in a common plane such that the fastener is substantially flat, and
   wherein the spring arrangement comprises one or ore spring arms configured to press on the first side of the components between the channels.

2. The fastener according to claim 1, having a thumb pad which, in said use, facilitates manual insertion of the snap fit members.

3. The fastener according to claim 2, wherein the thumb pad is detachable from the fastener.

4. The fastener according to claim 1, wherein each of the snap-fit members has a ramp surface which, in said use, presses against a side of the respective channel to laterally deflect the snap-fit member during its insertion, the snap-fit member returning to its pre-deflected configuration when the abutment surface emerges from the channel.

5. The fastener according to claim 1, wherein each snap-fit member is configured to facilitate manual release of the abutment surface from engagement with the second side of the components, whereupon the fastener can be removed from the components.

6. The combination of a fastener according to claim 1 and a side plate, the side plate having two holes for receiving the respective two snap-fit members, and, in use, being located at the first or second side of the components to respectively provide a surface on which, in said use, the spring arrangement presses, or a surface which, in said use, enters into snap-fit engagement with the abutment surfaces.

7. The combination according to claim 6, further including a second side plate which, in said use, is located at the other of the first and second sides of the components.

8. The fastener according to claim 1, wherein each of the resiliently deformable snap-fit members extends from the spring arrangement.

9. The fastener according to claim 1, wherein each of the resiliently deformable snap-fit members extends from the fastener in a direction oriented towards a direction of insertion of the resiliently deformable snap-fit members to the first and second components.

10. The fastener according to claim 1, wherein each of the resiliently deformable snap-fit members extends from the fastener at a first end and have a second end opposite the first end, the abutment surfaces being positioned between the first end and the second end, and wherein each of the resiliently deformable snap-fit members comprises a lead-in ramp between the second end and the abutment surface.

11. The fastener according to claim 1, wherein the one or more spring arms extend inwardly, towards an axis of symmetry of the fastener, from opposing sides of the fastener.

12. The fastener according to claim 1, wherein the one or more spring arms are integral with the two resiliently deformable snap-fit members.

13. A fastening apparatus, comprising:
   a first component;
   a second component; and
   a fastener for clamping the first component to the second component, the fastener having:
   two resiliently deformable snap-fit members which are configured to be inserted from a first side of the first and second components through two channels in each of the first and second components, each of the resiliently deformable snap-fit members being insertable into a respective one of the two channels, the two channels being formed in each of the first and second components, each of the snap-fit members having an abutment surface being arranged, when so inserted, to emerge from the respective channel and enter into a snap-fit engagement with an opposing second side of the components to prevent refraction of the snap-fit member; and
   a spring arrangement which is configured, when the snap-fit members are so inserted, to press on the first side of the components between the channels to apply a compressive clamping force across the components between the spring arrangement and the abutment surfaces,
      wherein the spring arrangement and the two resiliently deformable snap-fit members are arranged in a common plane such that the fastener is substantially flat, and
   wherein the spring arrangement comprises one or more spring arms configured to press on the first side of the components between the channels.

14. A fastener for clamping a first component to a second component, the fastener comprising:
   two resiliently deformable snap-fit members which are configured to be inserted from a first side of the first and second components through two channels in each of the first and second components, each of the resiliently deformable snap-fit members being insertable into a respective one of the two channels, the two channels being formed in each of the first and second components, each of the snap-fit members having an abutment surface being arranged, when so inserted, to emerge from the respective channel and enter into a snap-fit engagement with an opposing second side of the components to prevent refraction of the snap-fit member; and
   a spring arrangement which is disposed between the two snap-fit members and configured, when the snap-fit members are so inserted, to press on the first side of the components between the channels to apply a compressive clamping force across the components between the spring arrangement and the abutment surfaces,
      wherein the spring arrangement and the two resiliently deformable snap-fit members are arranged in a common plane such that the fastener is substantially flat, and wherein the spring arrangement comprises one or more spring arms configured to press on the first side of the components between the channels.

* * * * *